P. LARSEN.
CHEESE HOOP AND FOLLOWER.
APPLICATION FILED NOV. 13, 1915.
1,195,370.
Patented Aug. 22, 1916.
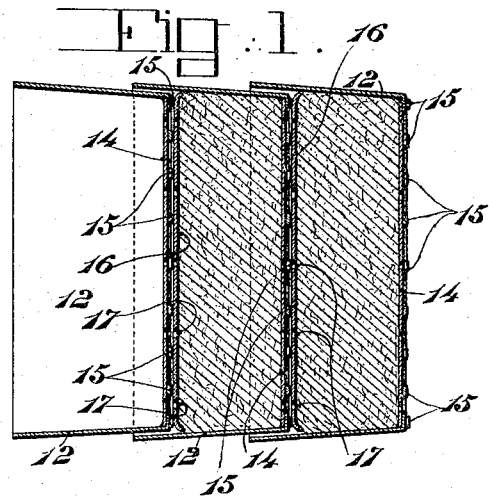
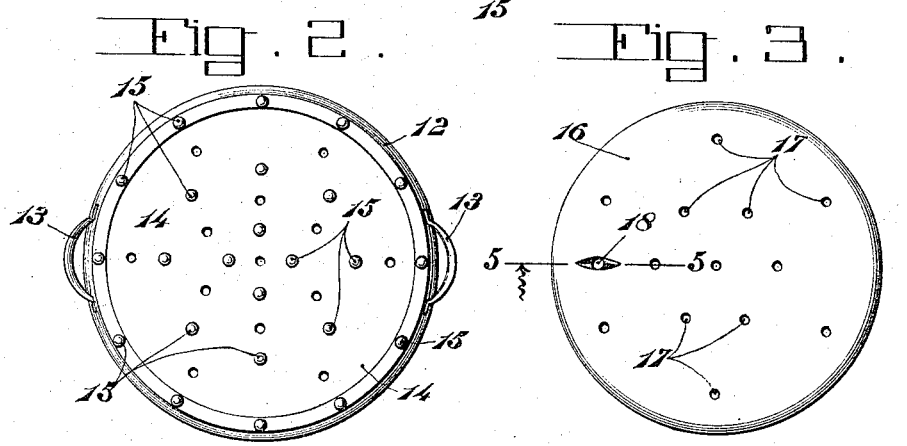
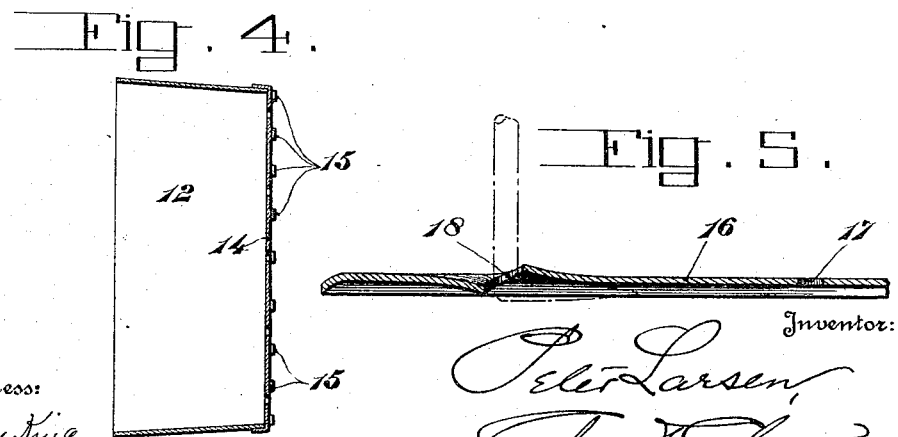
Witness:
Harry King.
Inventor:
Peter Larsen,
By Calvert Calvert
Attorneys.

UNITED STATES PATENT OFFICE.

PETER LARSEN, OF CATTARAUGUS, NEW YORK.

CHEESE-HOOP AND FOLLOWER.

1,195,370.  Specification of Letters Patent.  Patented Aug. 22, 1916.

Application filed November 13, 1915. Serial No. 61,306.

*To all whom it may concern:*

Be it known that I, PETER LARSEN, a citizen of the United States, residing at Cattaraugus, in the county of Cattaraugus and State of New York, have invented or discovered certain new and useful Improvements in Cheese-Hoops and Followers, of which the following is a specification, reference being had therein to the accompanying drawing.

This invention relates to cheese hoops and followers and more particularly to that class of these devices which are intended to be used in gang presses, and the invention has for its object to provide an improved metal cheese hoop and an improved sanitary metal follower to coöperate therewith.

The cheese hoop followers which have heretofore largely been in use have been made of wood, and have been provided with drainage holes and grooves to adapt them to coöperate with cheese hoops having smooth bottoms or ends which come in contact with the followers, and cloth or felt packing rings have generally been used in connection with these wooden followers. These packing rings are unsanitary in that it is difficult or impossible to cleanse them thoroughly, and the absorbent wooden followers are difficult to cleanse, so that they likewise become more or less unsanitary.

This invention has for its object therefore to provide cheese hoops and followers which may be readily cleansed, and which are simple in construction and efficient in operation. To this end the present improved cheese hoop is provided with spacing projections at its bottom or end, so as to adapt it for coöperation with a perforated but smooth-surfaced metallic follower. The spacing perforations on the end or bottom of the cheese hoop afford proper drainage for the whey when the cheeses are being compressed in a gang press, and the smooth-surfaced metal followers are constructed to fit so closely in the insides of these hoops that no packing rings will be required, and the perforated, plain-surfaced metal follower may therefore be readily and thoroughly cleansed after use.

In the accompanying drawing Figure 1 shows a plurality of the improved cheese hoops and followers in the positions which they will occupy when in a gang press. Fig. 2 is a bottom view of the improved cheese hoop. Fig. 3 is a plan view of one of the improved followers. Fig. 4 is a sectional view illustrating a slightly modified form of cheese hoop embodying the present invention, and Fig. 5 is a detail sectional view on line 5—5, Fig. 3.

Referring to the drawing, 12 denotes the body of the cheese hoop which may be provided with handles 13, as is usual. As is common in making cheese hoops generally the improved cheese hoop has an open end and a closed end or bottom 14. The closed end or bottom is perforated and is provided on its outer or lower side with a series of spacing projections 15. These spacing projections may be of any suitable form, and may be applied in any suitable manner, but will preferably consist of small disks of metal integrally attached to the bottoms of the hoops by "spot welding". It will be understood that these spacing projections may be applied not only to cheese hoops having permanently attached bottoms, as in the construction shown in Fig. 1, but also to cheese hoops which have removable bottoms fitting the bodies of these hoops like the covers of metallic vessels, as will be understood from Fig. 4.

Coöperating with the cheese hoops having spacing projections on their bottoms are plain surfaced followers 16 provided with holes or perforations 17, and with one or more apertures 18 at which the metal is depressed and raised, as shown in the detail view Fig. 5, for the purpose of the convenient insertion of a sharp hook by which the follower is removed from the hoop after the pressing operation. The plain surfaced followers are constructed to fit so closely in the hoops that no packing rings need be used in connection therewith, the bandage in which the cheese is usually molded forming a sufficient packing. These plain-surfaced followers, having no spacing projections and each consisting of a perforated disk of sheet metal, are preferably made with slightly inturned or down-turned integral peripheral edges, thus giving these followers a slightly dishing form, as more clearly shown in Fig. 2, so that they have a tendency to force the cheese curd inward away from the hoop.

I am aware that perforated metallic followers provided with spacing projections have heretofore been used in connection with metallic cheese hoops, but certain decided advantages result from providing the bottoms of the cheese hoops with spacing projections, rather than providing the followers with such spacing projections. One advantage is due to the fact that by providing the bottoms of the cheese hoops with spacing projections plain-surfaced followers, which may be readily cleansed, may be used in connection therewith, and as these spacing projections are on the outer surfaces of the bottoms of the hoops they have no tendency to collect dirt or unsanitary material in the cheese hoops themselves, the insides of which are plain or smooth. Another advantage results from the fact that the spacing projections on the bottoms of the cheese hoops serve as guards to prevent wear of the bottoms of the cheese hoops when moved about on the somewhat rough concrete floors of the cheese factories.

For simplicity of illustration the improved cheese hoop is hereby shown as being made plain, but it will be understood that the invention may be applied to any usual or well known forms of cheese hoops, as to cheese hoops having "bandagers" and strengthening bands.

Having thus described my invention I claim and desire to secure by Letters Patent;

1. A cheese hoop having a closed end or bottom provided with perforations and with spacing projections on its outer or lower face, combined with a one-piece plain-surfaced, perforated, metallic follower closely fitting the open top part of the cheese hoop.

2. A cheese hoop having a closed end or bottom provided on its outer or lower face with perforations and with spot-welded disks or buttons serving as spacing projections, combined with a one-piece, plain-surfaced, perforated, metallic follower closely fitting the open top part of the cheese hoop.

3. A one-piece cheese hoop follower consisting of a plain perforated, sheet-metal disk having a slightly inturned or downturned, integral peripheral edge, giving the follower a slightly dishing form.

In testimony whereof I affix my signature.

PETER LARSEN.

Copies of this patent may be obtained for five cents each, by addressing the "Commissioner of Patents, Washington, D. C."